Dec. 22, 1953 C. J. MANNEY ET AL 2,663,347
TRACTION CHAIN AND COUPLING
Filed Oct. 26, 1949
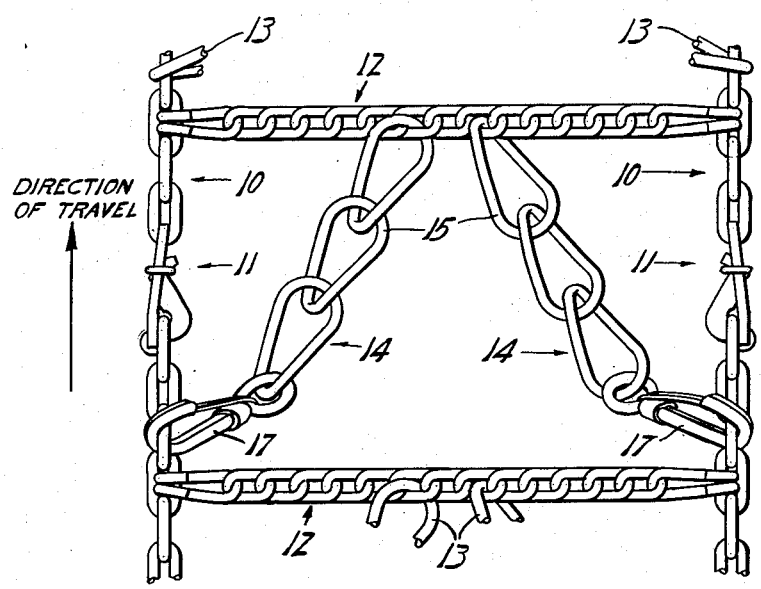
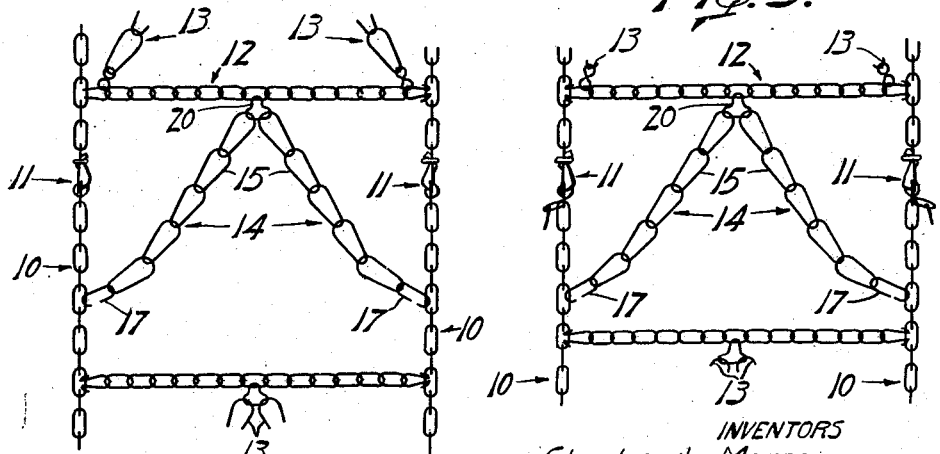
INVENTORS
Charles J. Manney
William H. Devonshire
Bean, Brooks, Buckley & Bean
ATTORNEYS

Patented Dec. 22, 1953

2,663,347

UNITED STATES PATENT OFFICE 2,663,347

TRACTION CHAIN AND COUPLING

Charles J. Manney, Kenmore, and William H. Devonshire, Williamsville, N. Y., assignors to Columbus McKinnon Chain Corporation, Tonawanda, N. Y.

Application October 26, 1949, Serial No. 123,774

1 Claim. (Cl. 152—239)

This invention relates to traction chains, and more particularly to traction chains for rubber tired vehicles such as farm tractors and the like which employ tires having heavy V shaped or other diagonally disposed cleats molded into the tread surface thereof.

One of the objects of the invention is to provide improvements in tire chains of the type employing traction elements which extend diagonally over the tread of the tire.

Another object of the invention is to provide an improved traction chain of the oblique cross chain type which is adapted to be adjustably coupled upon a vehicle wheel in improved manner, while compensating for variances in the tire dimensions and/or elongation of the traction chain under service conditions.

Another object of the invention is to provide an improved traction chain of the character aforesaid which in addition to the advantages set forth hereinabove provides improved traction results.

Other objects and advantages of the invention will appear from the specification hereinafter.

In the drawings:

Fig. 1 is a fragmentary plan view of a traction chain of the invention, showing the novel traction chain element and coupling arrangement thereof;

Fig. 2 is a fragmentary plan view thereof showing diagrammatically the novel chain coupling arrangement in one position of adjustment; and Fig. 3 is a fragmentary plan view similar to Fig. 2 but showing the chain coupling arrangement in another position of adjustment.

The invention contemplates a traction chain of the type including a pair of side chains which are adapted to lie alongside opposite side walls of a vehicle tire, and with suitable latch devices at the opposite ends thereof adapted to be manually operated for coupling the chain in operative position upon the vehicle wheel. The side chains are interconnected by cross chain elements which extend at suitable intervals around the periphery of the tire, from one side chain to the other, thus traversing the tread portion of the vehicle tire. These cross chain elements are designed to be snugly taut against the tire tread when the device is mounted upon the wheel.

The traction chain elements of the device of the invention comprise separate chain elements which extend obliquely transversely of the tire tread at intervals therearound; said traction chain elements being specially designed so as to be slack relative to the tire tread when the device is mounted upon the wheel. Thus, the traction chain elements are permitted to flap about relative to the tire tread whereas the cross chain elements are snugly drawn thereagainst. This action permits the traction chain elements to slap relative to the tire tread when the mounting wheel is revolving; whereby dirt and mud or ice accumulations picked up within the links of the traction chain elements are being continuously dislodged and shaken loose therefrom. This prevents clogging of the traction chain elements in such manner as would otherwise substantially reduce the tractive effectiveness of the device. Also, the traction chain elements comprise lengths of chain which may be formed of relatively large size links, as clearly shown in the drawing, compared to the relatively small size links of the cross chains, which feature aids in the dislodgement of dirt and other accumulations from said traction chain elements.

More specifically, Fig. 1 illustrates an application of the invention to a tire chain comprising oppositely paired side chain elements 10—10 having detachable fastener devices 11—11 at one terminal thereof and taut cross chain elements 12—12 extending therebetween at spaced intervals. The traction chain elements between adjacent cross chains are indicated at their connecting end link portions 13, and are adapted to extend diagonally between adjacent cross chains in the manner aforesaid. These traction chain elements having connecting end link portions 13 are not shown in full on the drawing, but are identical in configuration with the illustrated terminal traction chain elements 14, 14 which are about to be described. The terminal traction link elements are indicated generally at 14—14 to comprise interlinked twisted chain links 15; the traction chain elements 14—14 being adapted to be disposed in V-shaped configuration relative to the tread center line in the manner of the arrangement of the other traction chain pairs as explained hereinabove. Thus, the terminal traction chain elements 14—14 are permanently connected to the center portion of one of the terminal cross chains 12, and then at the leg end portions thereof by means of hooks 17—17 to the side chain devices 10—10 or to outside link portions of the next cross chain element 12 as may be preferred. However, as shown in Fig. 1, it is a particular feature of the invention that the paired terminal traction link elements are provided to terminate in hook links 17 which are adapted to be hooked into any one of the cross chain or side chain links so that when the chain device is mounted upon a wheel tire and the fasteners 11—11 are pulled taut into coupled condition, the terminal traction chain elements bridging the space between the two terminal cross chain elements may then be hooked into any conveniently reached side chain links.

Thus, this arrangement makes allowances for adjustments in the fit of the chain device to vehicle tires in various conditions of wear; and in any case therefore the side and cross chain link elements may be drawn into tautly fitting relation upon the tire and the traction chain elements may be arranged to be properly "slack" so as to provide the improved traction and self-cleaning effects referred to hereinabove.

Figs. 2–3 illustrate a slight modification of the invention wherein the terminal traction chain elements 14—14 are in each case fastened at one end by means of a link 20 to one of the center links of one of the terminal cross chain elements and at their other ends by means of the hook devices 17—17 to any conveniently available side or cross chain link, thus "bridging" the connectors 11—11 to provide tractive effectiveness entirely around the tire while disposing the slack traction chain elements to cross the diagonally disposed cleat formations of tractor wheel tires to provide the combination improved traction and self-cleaning characteristics referred to hereinabove.

As stated before, it is a particular feature of the invention that one of the terminal cross chain elements of the device is provided with a pair of traction chain elements extending in divergent relation from the center thereof; said traction chain elements being fitted with hook-on devices at their free ends whereby they may be hooked onto the other terminal cross chain or on the side chains so as to bridge the gap between the two terminal cross chains with traction chain devices that are slack relative to the tire tread while the side chains and cross chains are in taut condition. Thus, as shown in Fig. 2, if when the side chain fasteners 11—11 are engaged the distance between the terminal cross chains is relatively great, the hooks 17—17 will be engaged in appropriately higher links of the side chains so as to permit the traction chains 14—14 to "bridge" the position of the fasteners while still being in slack condition. However, if as shown in Fig. 3, the device is applied to a slightly smaller tire the side chains will be more closely coupled so as to bring the terminal cross chains closer together than in Fig. 2. In such case the traction chain hooks 17—17 will be engaged in relatively lower side chain links; but in all cases the bridging traction chain elements will be in slack condition as explained hereinabove. It is apparent that the terminal traction chain elements 14, 14, being those which extend between the cross chains at the end of the side chains, act to bridge the side chain fasteners 11, 11 and are thus bridging chain elements or bridge chains as distinguished from the traction chain elements identified at 13, 13.

Whereas only two forms of the invention have been shown and described in detail, it will be apparent to those skilled in the art that the invention is not so limited but that various changes may be made therein without departing from the spirit of the invention or the scope of the appended claim.

What is claimed is:

A tire chain assembly comprising a pair of side chains each having opposite ends detachably connected with each other by a fastener carried by one end of the said chain and detachably engaged with its other end and thus forming a continuous side chain extending entirely about the circumference of a side portion of a tire when the chain assembly is applied thereto in position for use, cross chains extending between said side chains and spaced longitudinally thereof, opposite ends of each cross chain being connected with links of the side chains, said cross chains being all of the same length and each of such length that it extends across the tread portion of a tire in taut condition when the chain assembly is applied to a tire of predetermined diameter, and pairs of traction chains extending diagonally in spaces between the cross chains, one pair of traction chains having inner ends connected with a cross chain substantially midway the length thereof and extending therefrom in diverging relation to each other towards the side chains and having outer ends detachably connected with selected links of the said side chains near the next cross chain, said traction chains consisting of links larger than the links of the cross chains, and said traction chains all diverging circumferentially of the tire in the same direction and being all of such length that when the chain assembly is applied to a tire the traction chains extend loosely across the tread portion of the tire.

CHARLES J. MANNEY.
WILLIAM H. DEVONSHIRE.

References Cited in the file of this patent
UNITED STATES PATENTS

| Number | Name | Date |
|---|---|---|
| 801,115 | Smith | Oct. 3, 1905 |
| 1,338,772 | Hart | May 4, 1920 |
| 1,465,710 | Corrington | Aug. 21, 1923 |
| 1,537,862 | Mohr et al. | May 12, 1925 |
| 1,714,720 | Meyer | May 28, 1929 |
| 1,905,237 | Martel | Apr. 25, 1933 |
| 2,086,512 | Reyburn | July 6, 1937 |

FOREIGN PATENTS

| Number | Country | Date |
|---|---|---|
| 167,006 | Switzerland | Apr. 16, 1934 |